(12) United States Patent
Duarte

(10) Patent No.: US 11,780,594 B2
(45) Date of Patent: Oct. 10, 2023

(54) TRANSPARENCY INCLUDING A WIRELESS SENSOR

(71) Applicant: PPG Industries Ohio, Inc., Cleveland, OH (US)

(72) Inventor: Nicolas B. Duarte, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 828 days.

(21) Appl. No.: 16/590,548

(22) Filed: Oct. 2, 2019

(65) Prior Publication Data

US 2021/0101687 A1   Apr. 8, 2021

(51) Int. Cl.
| | |
|---|---|
| *B64D 15/12* | (2006.01) |
| *H02J 50/20* | (2016.01) |
| *B64C 1/14* | (2006.01) |
| *G01K 1/024* | (2021.01) |
| *G08C 17/02* | (2006.01) |
| *H05B 1/02* | (2006.01) |
| *H05B 3/86* | (2006.01) |
| *G01J 5/02* | (2022.01) |
| *G01K 7/02* | (2021.01) |
| *G01K 7/22* | (2006.01) |

(52) U.S. Cl.
CPC ............ *B64D 15/12* (2013.01); *B64C 1/1484* (2013.01); *G01K 1/024* (2013.01); *G08C 17/02* (2013.01); *H02J 50/20* (2016.02); *H05B 1/0236* (2013.01); *H05B 3/86* (2013.01); *B64D 2221/00* (2013.01); *G01J 5/025* (2013.01); *G01K 7/02* (2013.01); *G01K 7/22* (2013.01); *G08C 2200/00* (2013.01)

(58) Field of Classification Search
CPC .. B64D 15/12; B64D 2221/00; B64C 1/1484; G01K 1/024; G01K 7/02; G01K 7/22; G08C 17/02; G08C 2200/00; G08C 13/00; H02J 50/20; H05B 1/0236; H05B 3/86; G01J 5/025
See application file for complete search history.

(56) References Cited

U.S. PATENT DOCUMENTS

| | | |
|---|---|---|
| 4,610,771 A | 9/1986 | Gillery |
| 4,744,809 A | 5/1988 | Pecoraro et al. |
| | (Continued) | |

FOREIGN PATENT DOCUMENTS

| | | |
|---|---|---|
| EP | 1648200 | 4/2006 |
| EP | 2879951 | 6/2015 |
| | (Continued) | |

*Primary Examiner* — Valentina Xavier

(57) ABSTRACT

A transparency includes a plurality of sheets. Each sheet of the plurality of sheets can include a first major surface, an opposite second major surface, and a peripheral surface between the first major surface and the second major surface. The transparency can further include: an inter-sheet layer positioned between the first major surface of one of the sheets of the plurality of sheets and the second major surface of an adjacent sheet of the plurality of sheets; and a wireless sensor positioned in the inter-sheet layer. The wireless sensor includes a sensory portion configured to measure information representative of a condition of a portion of the transparency and a wireless transmitter configured to wirelessly transmit the received information to a wireless receiver.

20 Claims, 8 Drawing Sheets

(56) References Cited

U.S. PATENT DOCUMENTS

| | | | |
|---|---|---|---|
| 4,806,220 A | 2/1989 | Finley | |
| 5,675,944 A | 10/1997 | Kerr et al. | |
| 5,821,001 A | 10/1998 | Arbab et al. | |
| 6,094,942 A | 8/2000 | Falleroni et al. | |
| 6,490,543 B1 | 12/2002 | Jaw | |
| 6,747,780 B2 | 6/2004 | Xu et al. | |
| 7,450,294 B2 | 11/2008 | Weidner | |
| 7,586,664 B2 | 9/2009 | O'Shaughnessy | |
| 8,064,120 B2 | 11/2011 | Callahan et al. | |
| 8,084,120 B2 | 12/2011 | Hill et al. | |
| 8,155,816 B2 * | 4/2012 | Rashid | G06Q 10/20 701/31.4 |
| 8,383,994 B2 | 2/2013 | Rashid et al. | |
| 9,919,787 B2 | 3/2018 | Jiao et al. | |
| 9,983,171 B2 | 5/2018 | Jiao et al. | |
| 10,063,047 B2 | 8/2018 | Duarte et al. | |
| 10,129,932 B2 | 11/2018 | Briggs et al. | |
| 11,154,408 B2 * | 10/2021 | McDonald | A61H 3/00 |
| 2002/0113168 A1 | 8/2002 | Rukavina et al. | |
| 2008/0042012 A1 | 2/2008 | Callahan et al. | |
| 2008/0191841 A1 | 8/2008 | Fourreau | |
| 2008/0239451 A1 | 10/2008 | Mitchell et al. | |
| 2010/0163675 A1 | 7/2010 | Rashid et al. | |
| 2010/0168935 A1 | 7/2010 | Rashid et al. | |
| 2012/0173438 A1 | 7/2012 | Rashid et al. | |
| 2013/0075531 A1 | 3/2013 | Jiao et al. | |
| 2013/0328416 A1 * | 12/2013 | Whitworth | F03G 5/06 307/149 |
| 2015/0171624 A1 * | 6/2015 | Duarte | B64D 15/12 361/49 |
| 2015/0229030 A1 * | 8/2015 | Dai | C03C 27/10 219/203 |
| 2018/0176755 A1 * | 6/2018 | Zhao | H04W 16/02 |
| 2019/0319451 A1 * | 10/2019 | Duarte | B64C 1/1476 |
| 2020/0022275 A1 * | 1/2020 | Vemulapally | G01K 1/14 |
| 2021/0040789 A1 * | 2/2021 | Rozbicki | C09K 9/02 |
| 2021/0252835 A1 * | 8/2021 | Wright | B32B 17/10376 |
| 2021/0402854 A1 * | 12/2021 | Noda | B60H 3/00 |

FOREIGN PATENT DOCUMENTS

| | | |
|---|---|---|
| RU | 2007143572 A | 6/2009 |
| WO | 2010077507 A2 | 7/2010 |
| WO | 2018102451 | 6/2018 |

* cited by examiner

TRANSPARENCY INCLUDING A WIRELESS SENSOR

FIELD OF THE INVENTION

The present disclosure relates to transparencies and, in particular, to a transparency including a wireless sensor positioned in an inter-sheet layer of the transparency.

BACKGROUND OF THE INVENTION

Transparencies can be laminated articles comprising a plurality of sheets and inter-sheet layers. The sheets and inter-sheet layers can be laminated together by a conventional lamination process, as is known in the art. The transparencies can contain sensors connected to the transparency and used for sensing information related to a condition of the transparency. The sensors can include a variety of different sensor types for measuring different properties of the transparency and/or ambient conditions in proximity to the transparency including temperature sensors, moisture sensors, impact sensors, crack sensors, rupture sensors, arcing sensors, corrosion sensors, breakage sensors, current sensors, partial discharge sensors, voltage sensors, resistance sensors, and/or p-static sensors.

In conventional transparency monitoring systems, sensors can be connected to a controller or control system that receives, processes, and/or analyzes information from the sensors. The controller or control systems can be configured to perform an action when information received from the sensors indicates that the transparency is performing outside of acceptable operating limits. The action performed by the controller or control system can include turning off electrical systems related to operation of the transparency or restricting flow of electric current to electrical circuitry of the transparency to prevent damage to the transparency. An aircraft windshield comprising a transparency, sensors, and associated controllers is described at column 5, lines 16-52 and column 7, lines 14-50 of U.S. Pat. No. 10,063,047, which is incorporated by reference herein.

Sensors can be mounted to outwardly facing surfaces of the sheets or between an inwardly facing surface of a sheet and an inter-sheet layer. Sensors can also be positioned between a surface of a sheet and a moisture seal surrounding a periphery of the transparency. In conventional transparencies, the sensors are wired sensors comprising wires extending from the sensors to the controller or control system. The wired sensors can be integrated into the laminated transparency and can extend through the transparencies to peripheral edges of the transparencies. The wires can extend through openings in the peripheral edges in the transparency.

The wires and openings can be potential failure points for conventional transparencies, such as those used on an aircraft. Moisture may enter into an interior of the transparency through the openings damaging the inter-sheet layers. Also, wires can flex or bend as an aircraft pressurizes and/or as the transparency heats or cools, which can stress solder joints that mount the wires to the sensors. Prolonged stress can cause the wires to pull away from the solder joints causing the sensors to fail. Temperature sensors including wire arrangements designed to reduce stresses on solder joints of the sensors are described at column 5, lines 7-32 of U.S. Pat. No. 10,129,932, which is incorporated by reference herein.

SUMMARY OF THE INVENTION

The invention can include a transparency comprising a plurality of sheets. Each sheet can include a first major surface, an opposite second major surface, and a peripheral surface between the first major surface and the second major surface. The transparency can further include an inter-sheet layer positioned between the first major surface of one of the sheets of the plurality of sheets and the second major surface of an adjacent sheet of the plurality of sheets and a wireless sensor positioned in the inter-sheet layer. The wireless sensor comprises a sensory portion configured to measure information representative of a condition of a portion of the transparency and a wireless transmitter configured to wirelessly transmit the received information to a wireless receiver.

The invention can also include an aircraft windshield comprising any of the previously described transparencies and a mounting bracket for mounting the transparency to a fuselage of the aircraft.

The invention can also include a transparency monitoring system including any of the previously described transparencies and a wireless receiver in wireless communication with the wireless sensor of the transparency configured to receive and process the information from the wireless sensor.

The invention can also include a method of making a laminated transparency comprising: fabricating one of the previously described transparencies by joining together a plurality of sheets, wherein adjacent sheets are spaced apart by the inter-sheet layer; and during fabrication of the transparency, placing the wireless sensor in the inter-sheet layer between the adjacent sheets of the plurality of sheets.

The invention can also include a monitoring method for a transparency. The method can include: receiving, via a wireless receiver, a first signal representative of a temperature of a portion of the transparency from a wireless temperature sensor positioned in an inter-sheet layer of the transparency; and processing, with a processor of the wireless receiver, the received first signal to generate a second signal representative of the temperature of the portion of the transparency. The second signal can be compatible with a heater controller configured to heat a conductive coating of the transparency. The method can further include transmitting the second signal from the wireless receiver to the heater controller.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

Further features and other examples and advantages will become apparent from the following detailed description made with reference to the drawings in which.

DETAILED DESCRIPTION OF THE INVENTION

Figure 1A:
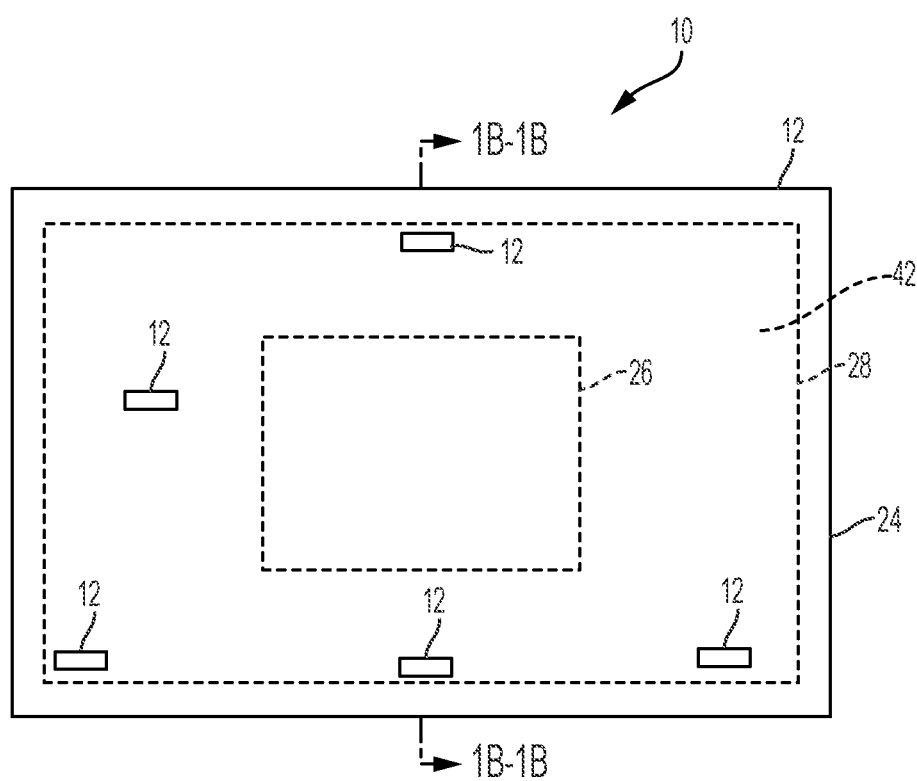
FIG. 1A is a top view of a transparency including wireless sensors.

As used herein, the terms "right", "left", "top", "bottom", and derivatives thereof shall relate to the invention as it is oriented in the drawing figures. However, for purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

In addition, in this application, the use of "or" means "and/or" unless specifically stated otherwise, even though "and/or" may be explicitly used in certain instances. In this application, the use of the singular includes the plural and plural encompasses singular, unless specifically stated otherwise. Further, as used herein, the singular form of "a", "an", and "the" include plural referents unless the context clearly dictates otherwise. For example, although the invention is described herein in terms of "a" transparency, "a" wireless sensor, or "a" wireless receiver, one or more of any of these components or any other components recited herein can be used within the scope of the present disclosure.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that can be wired and/or wireless in nature. Additionally, two units or components can be in communication with each other even though the data transmitted can be modified, processed, routed, and the like, between the first and second unit or component. For example, a first unit can be in communication with a second unit even though the first unit passively receives data, and does not actively transmit data to the second unit. As another example, a first unit can be in communication with a second unit if an intermediary unit processes data from one unit and transmits processed data to the second unit. It will be appreciated that numerous other arrangements are also possible.

With reference to FIGS. 1-4, the present disclosure is directed to transparencies 10, such as windows, windshields, transparent or partially transparent wall panels, substrates, or similar articles. The transparencies 10 are generally transparent or translucent articles having a visible light transmittance sufficient to allow an individual to view objects through the transparency. The transparencies 10 can have a visual light transmittance of at least 10%. The transparencies 10 can be formed by laminating together a plurality of sheets and inter-sheet layers by conventional lamination techniques, as are known in the art. The transparencies 10 can be integrated with and/or mounted to a vehicle, such as an air vehicle (e.g., an aircraft or helicopter), land vehicle (e.g., an automobile, truck, bus, or train), or water vessel. As described in further detail herein, one or more of the transparencies 10 can be mounted to a fuselage of an aircraft to form an aircraft windshield.

The transparencies 10 comprise wireless sensors 12 for sensing information about a condition of the transparency 10. As used herein, information about a "condition" of a transparency 10 refers to information relevant to performance of the transparency, structural integrity of the transparency, environmental conditions around the transparency, materials absorbed by the transparency, and/or damage incurred by the transparency. The wireless sensors 12 can be positioned at any convenient location on or in the transparency 10. The wireless sensors 12 can be positioned in an inter-sheet layer of the transparency 10. As used herein, a sensor which is "positioned in" a layer or sheet is at least partially encapsulated by the layer or sheet. The sensor 12 may be fully encapsulated by the inter-sheet layer. Alternatively, the sensor 12 may be encapsulated between one of the sheets and an adjacent inter-sheet layer.

As described in further detail herein, the wireless sensors 12 are provided to reduce or eliminate potential failure points, which are present in conventional transparencies comprising wired sensors. Conventional heated transparencies, such as vehicle windshields, include wired sensors for monitoring the transparency during heating. The wired sensors are integrated into laminated portions of the transparencies. Wires extending from the sensors through the laminated portions of the transparencies can cause the transparency to fail at a number of known potential failure points, such as at solder joints (e.g., where the wires connect to other portions of the sensor circuitry) and at openings where the wires extend from the transparency. The openings can be locations for moisture ingress into the transparencies 10. Damage can also be caused by stresses exerted on the wires during operation of a vehicle, such as an aircraft. As the transparency is pressurized (e.g., when a pressure on one side of the transparency is different from a pressure on an opposing side of the transparency), stress is exerted on the solder joints and openings. The stress can damage the wires and/or cause the wires to disconnect from the solder joints. The stress applied to the wires can also crimp or bend wires, reducing a quality of the electrical signal passing through the wires. Damage to the wires and solder joints can affect performance of the transparency and reduce a lifespan of the transparency. Using wireless sensors, as described herein, reduces or eliminates such potential failure points, which reduces maintenance costs and increase the lifespan of the transparency. Also, replacing wired sensors with wireless sensors reduces manufacturing complexity, since wires do not need to be integrated into the transparency during lamination.

The present disclosure also relates to transparency monitoring systems 110 including the transparencies 10 and wireless sensors 12 disclosed herein. The monitoring systems 110 can be configured to integrate with existing electrical systems, such as vehicle electrical systems, configured to receive signals from conventional wired sensors. As described in further detail herein, conventional wired sensors generally output analog signals, such as analog signals representative of electric resistance of a sensory portion of the sensor 12. In contrast, the wireless sensors 12 of the present disclosure can output a digital signal. The monitoring systems 110 disclosed herein can be configured to translate the output digital signal from the wireless sensors into an analog signal corresponding to analog signals from the conventional wired sensors. The monitoring systems 110 disclosed herein can also be configured to provide the translated analog signals to other electrical systems and devices of a vehicle for controlling operation of the transparency and/or other vehicle systems.

For a heated transparency 10 including wireless temperature sensors 12 for monitoring a temperature of the transparency 10, the monitoring system 110 disclosed herein can output an analog signal for electrical resistance corresponding to an analog resistance signal output by an analog wired temperature sensor. The analog resistance signal can be provided to a conventional heater controller 118. As described herein, the conventional heater controller 118 can receive and act on the analog resistance signal in the same way as if the signal had originated from a conventional wired temperature sensor. Accordingly, the monitoring systems 110 of the present disclosure can be easily implemented with existing electrical systems and vehicles without needing to replace or upgrade the electrical systems to be compatible with wireless sensors.

Transparencies Having Wireless Sensors

Figure 1B:
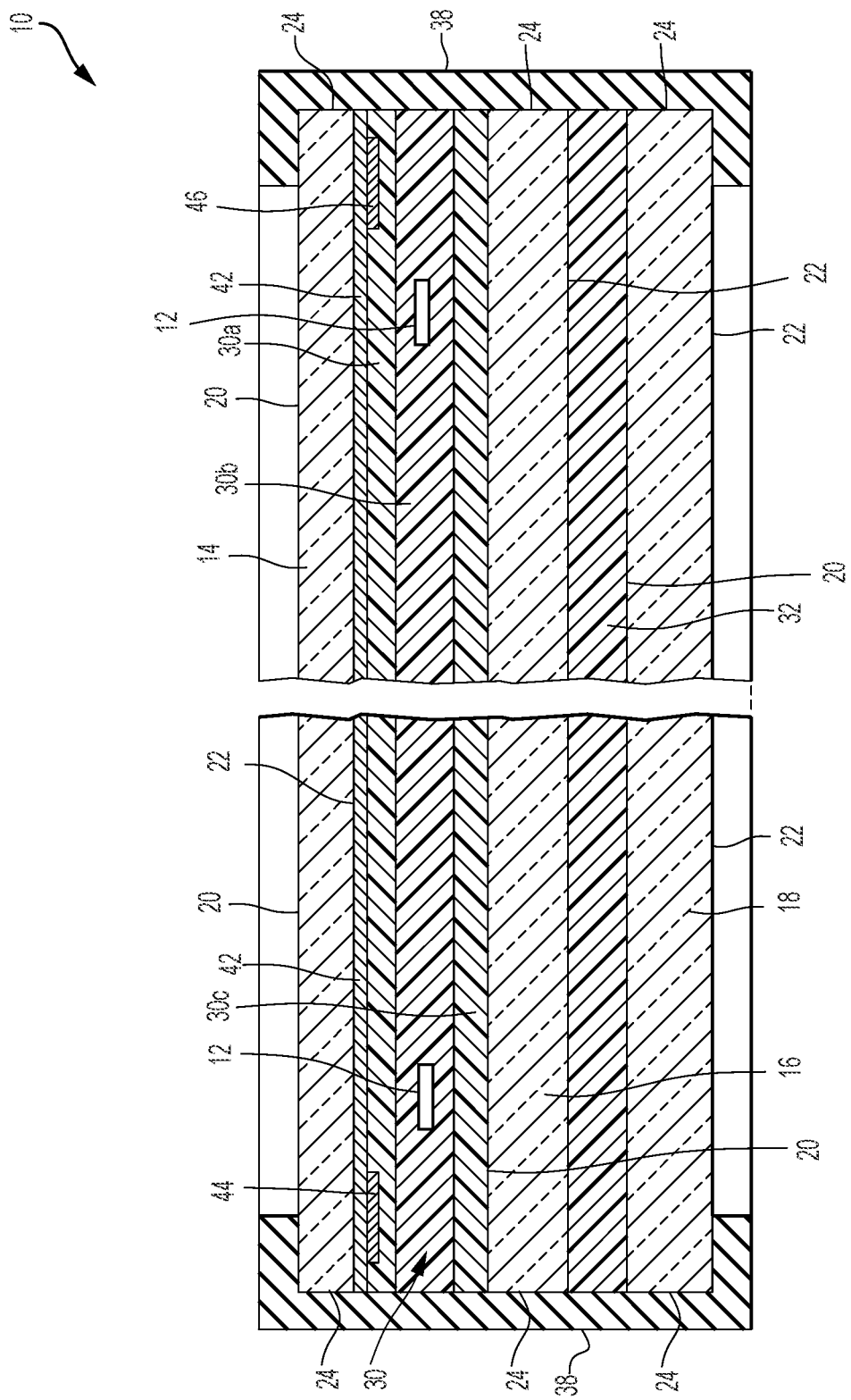
FIG. 1B is a cross-sectional view of the transparency of FIG. 1A taken along line 1B-1B.

With reference to FIGS. 1A and 1B, a transparency 10 including features of the present disclosure comprises a plurality of sheets, such as a first sheet 14, a second sheet 16, and a third sheet 18. The sheets 14, 16, 18 comprise a first or top major surface 20, an opposite second or bottom major surface 22, and a peripheral edge or peripheral surface 24 between the top major surface 20 and the bottom major surface 22. While an orientation of the sheets 14, 16, 18 is not intended to limit the scope of the present disclosure, as used herein, the first sheet 14 refers to a sheet having a top major surface 20 facing an exterior of a vehicle, such as an aircraft. The third sheet 18 refers to a sheet having a bottom major surface 22 facing an interior of the vehicle, such as the aircraft. The second sheet 16 is between the first sheet 14 and the third sheet 18. The sheets 14, 16, 18 can be glass, such as chemically or thermally treated glass, and/or plastic sheets. The transparency 10 can be configured to allow an individual to view objects through the transparency 10. In order to facilitate looking through the transparency 10, the transparency 10 can define a central viewing region 26 and a peripheral region 28 at least partially enclosing the central viewing region 26. Opaque components of the transparency 10, such as the wireless sensors 12 and other electronic circuitry, can be positioned in the peripheral region 28, so as not to obstruct an individual's view through the central viewing region 26.

The transparency 10 further comprises inter-sheet layers, such as first inter-sheet layer(s) 30 and second inter-sheet layer(s) 32, positioned between the sheets 14, 16, 18. As shown in FIG. 1B, the first inter-sheet layer(s) 30 are positioned between the bottom major surface 22 of the first sheet 14 and the top major surface 20 of the second sheet 16. A single second inter-sheet layer 32 is positioned between the bottom major surface 22 of the second sheet 16 and the top major surface 20 of the third sheet 18. The inter-sheet layers 30, 32 are generally formed from a softer material than the sheets 14, 16, 18 and separate the sheets 14, 16, 18 from one another to prevent adjacent sheets from damaging each other during use. The inter-sheet layers 30, 32 can be a soft polymer material, such as a polyurethane or a polyvinyl material. As shown in FIG. 1B, the first inter-sheet layer 30 can comprise urethane layers 30$a$, 30$c$ and a vinyl layer 30$b$, between the urethane layers 30$a$, 30$c$. The second inter-sheet layer 32 can be a single layer formed from a polyvinyl material.

The transparency 10 further comprises the wireless sensor 12 positioned in the inter-sheet layer(s) 30, 32 of the transparency 10. The transparency 10 can comprise multiple wireless sensors 12 at different locations on the transparency 10. The multiple wireless sensors 12 can each be the same type of sensor or can be different types of sensors. The wireless sensors 12 can be positioned in the peripheral region 28 of the transparency 10, so as not to distort an individual's view through the central viewing region 26 of the transparency 10.

As used herein, a "wireless sensor" can refer to a sensor comprising a sensory portion 34 (shown in FIGS. 2A and 2B) in the transparency 10, such as in the inter-sheet layer 30, 32 of the transparency 10. The sensory portion 34 is not connected by wires to any other electrical component or device of the transparency 10. In particular, the sensory portion 34 of the wireless sensor 12 is not directly connected by wires to either other electrical devices or components in the transparency 10 or to electrical devices remote from the transparency 10. The wireless sensor 12 wirelessly transmits sensed information from the sensory portion 34 to electronic devices or systems separate and remote from the transparency 10. The wireless sensor 12 can be powered wirelessly and/or can generate power independently. Alternatively or in addition, the wireless sensor 12 can include an independent power source, such as an energy storage device 52 (shown in FIG. 2A), such as a battery or capacitor, for providing power to electrical components of the wireless sensor 12.

The sensory portion 34 of the wireless sensor 12 is configured to measure information representative of a condition of a portion of the transparency 10. As discussed previously, monitoring the "condition" of the transparency 10 refers to sensing information relevant to performance of the transparency 10, structural integrity of the transparency 10, environmental conditions around the transparency 10, materials absorbed by the transparency 10, and/or damage incurred by the transparency 10. The wireless sensors 12 can comprise temperature sensors for measuring a temperature of the transparency 10 during heating, moisture sensors for detecting ingress of moisture into the transparency 10, and/or strain sensors for identifying stresses on the transparency 10 caused by environmental factors, impacts to the transparency 10 and other damage. Stresses can also be caused by vehicle vibration and other forces generated by operation of the vehicle to which the transparency 10 is mounted. Information from the different types of wireless sensors 12 can be used to monitor the transparency 10 and to control operation of electrical systems associated with the transparency 10.

Figure 2A:
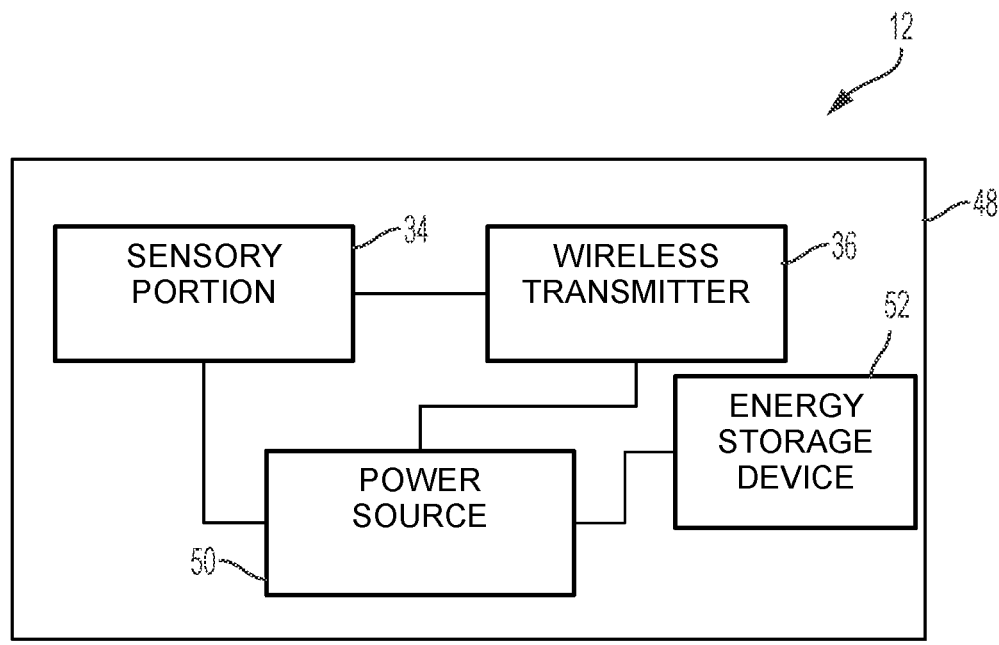
FIGS. 2A and 2B are schematic drawings of a wireless temperature sensor, which can be used with the transparency of FIG. 1A.
Figure 2B:
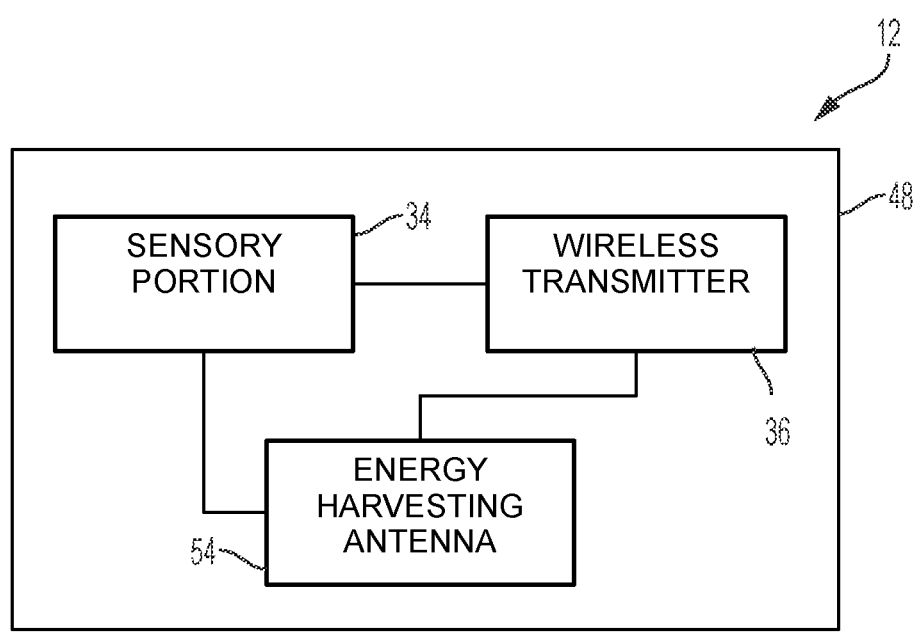
Figure 4:
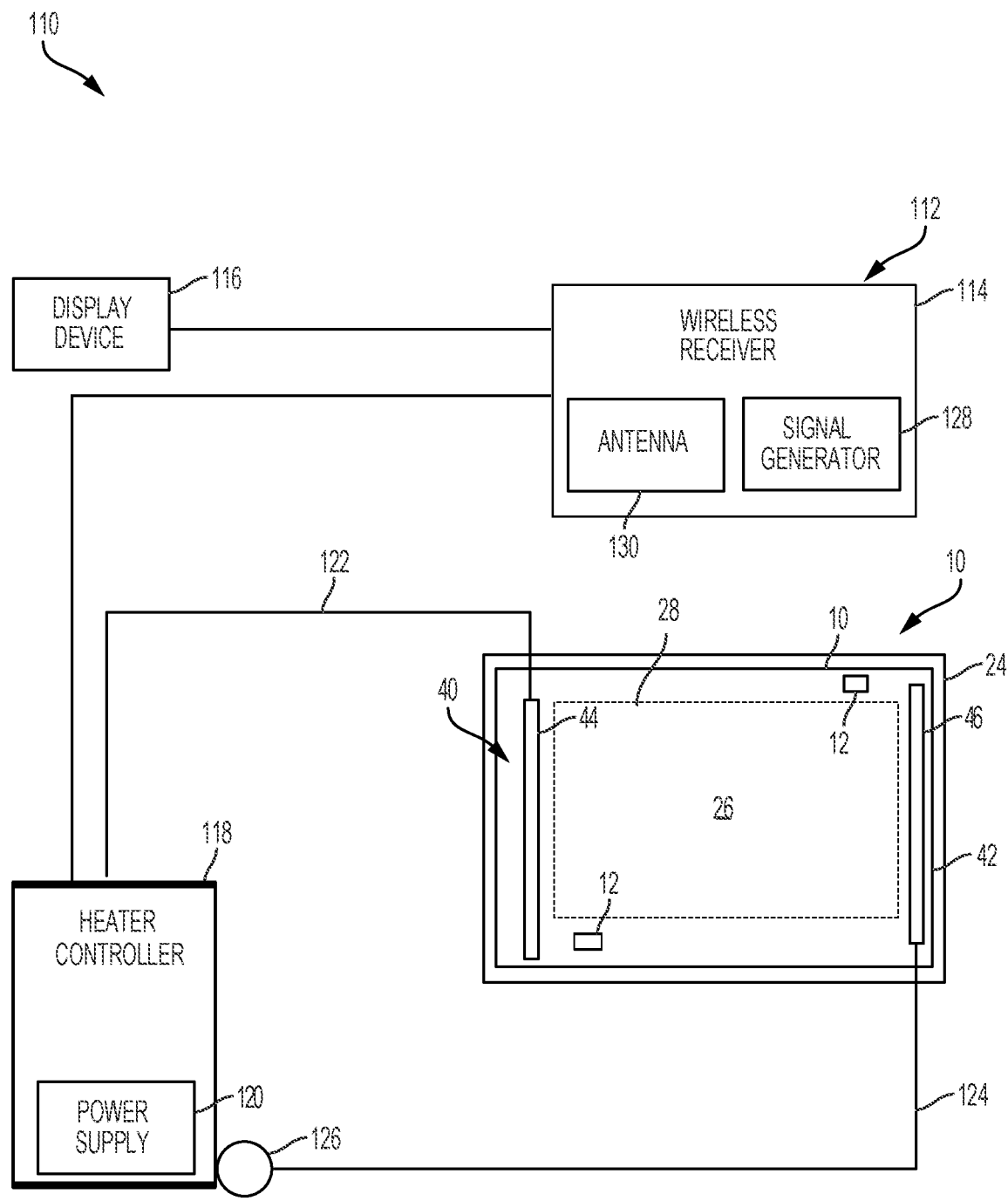
FIG. 4 is a schematic drawing of a monitoring system for the transparency of FIG. 1A.

The wireless sensors 12 further comprise a wireless transmitter 36 (shown in FIGS. 2A and 2B) electrically connected to the sensory portion 34 for wirelessly transmitting information sensed by the sensory portion 34 to an electronic device separate from the transparency 10, such as the wireless receiver 112 shown in FIG. 4. Electrical components of a wireless temperature sensor 12 including the sensory portion 34 and wireless transmitter 36 are shown in FIGS. 2A and 2B, and are described in further detail herein.

The transparency 10 can further comprise an edge member or moisture barrier 38 (shown in FIG. 1B) extending around the peripheral surface 24 of the transparency 10 and configured to seal the peripheral surface 24 of the transparency 10 from moisture. The moisture barrier 38 can be formed from any suitable waterproof sealing material, such as silicone rubber or other flexible durable moisture resistant materials. The moisture barrier 38 can be secured to a peripheral edge 24 of the transparency 10 by friction between an inner surface of the moisture barrier 38 and transparency 10. Various adhesives, liquid sealants, and similar materials can be used to enhance the seal between the moisture barrier 38 and transparency 10.

Figure 3:
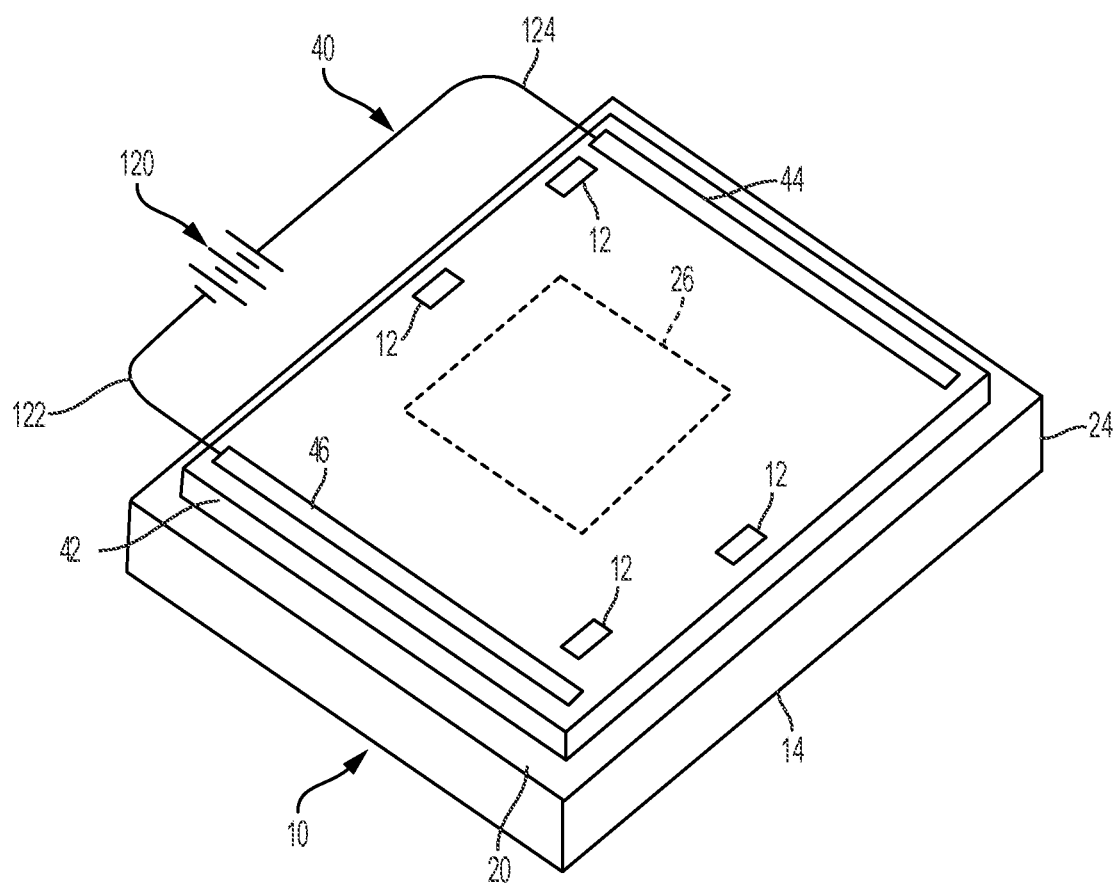
FIG. 3 is a schematic drawing of a heating arrangement for the transparency of FIG. 1A.

The transparency 10 further comprises a heating arrangement 40 for generating heat for defogging and/or de-icing the transparency 10. A schematic drawing of the heating arrangement 40 on the transparency 10 is shown in FIG. 3. The heating arrangement 40 can comprise a conductive coating 42 over at least a portion of a surface of one of the sheets 14, 16, 18. As shown in FIG. 1B, the conductive coating 42 covers at least a portion of the bottom major surface 22 of the first sheet 14. Placing the conductive coating 42 on an inwardly facing surface of one of the sheets 14, 16, 18 protects the conductive coating 42 from damage, thereby extending the usable life of the transparency 10. Alternatively, the conductive coating 42 may be deposited at other convenient locations on the sheets 12, 14, 16, such as on the top major surface 20 of the first sheet 14. The conductive coating 42 can comprise a resistive coating or film that heats when an electrical current is applied thereto. The conductive coating 42 can be transparent or translucent, and can have a visible light transmittance of at least 10%.

The conductive coating 42 can be made from any suitable sufficiently transparent or translucent electrical conductive material. Suitable materials include, but are not limited to, a pyrolytic deposited fluorine doped tin oxide film, such as NESA® sold by PPG Industries, Inc.; a magnetron sputter deposited tin doped indium oxide film, such as NESA-TRON® sold by PPG Industries Inc.; and/or other coating materials made from magnetron sputter deposited films, including metal films (e.g. silver between metal oxide films), zinc oxide, and/or zinc stannate. The films can be applied sequentially by magnetron sputtering.

The heating arrangement 40 further comprises elements electrically connected to the conductive coating 42 for providing electric current to the conductive coating 42. Various arrangements and designs of electrically conductive elements for providing power to the conductive coating 42 are known and can be adapted for use with the transparencies 10 disclosed herein. The electrically conductive element of the heating arrangement 40 can comprise bus bars 44, 46 (shown in FIG. 1B and FIG. 3) positioned along the peripheral viewing region 28 of the transparency 10. The bus bars 44, 46 can be elongated conductive members formed from metal, such as metal rods, strips, bars, or similar elongated members adhered to the conductive coating 42 and/or to a surface of one of the sheets 14, 16, 18. The bus bars 44, 46 can also be a conductive metal foil extending along a portion of the peripheral viewing region 28 of the transparency 10. Dimensions of the bus bar(s) 44, 46 can be selected based on a size of the transparency, amplitude of current passing between the bus bars 44, 46 and conductive coating 42, and other factors. Bus bar configurations that can be used with the transparencies 10 of the present disclosure are described at column 6, lines 3-60 of U.S. Pat. No. 10,063,047, which is incorporated by reference.

As described in further detail herein, the bus bars 44, 46 can be electrically connected to a power source 120 by wires or leads 122, 124 extending from the transparency 10 to the power source 120. The power source 120 can comprise any device capable of providing a suitable direct or alternating current to the bus bars 44, 46 for the purpose of heating the conductive coating 42. For example, the power source 120 can be a battery, current generator, AC/DC convertor, and/or similar electrical components, as are known in the art.

Wireless Sensors

Electrical components of the wireless sensors 12 are shown schematically in FIGS. 2A and 2B. As discussed previously, the wireless sensors 12 can comprise temperature sensors, moisture sensors, strain sensors, corrosion sensors, impact sensors, breakage sensors, current sensors, arcing sensors, and/or partial discharge sensors, as well as sensors for measuring voltage, resistance, and/or p-static of portions of the transparency. As will be appreciated by those skilled in the art, a temperature sensor refers to a sensor comprising a sensory portion 34 including a temperature-sensitive portion or material that undergoes an identifiable change in properties (e.g., a change in electrical properties, rigidity, viscosity, size, shape, volume, appearance, color, or any other measurable property) in response to temperature change. Information about the change in properties of the temperature-sensitive portion or material can be collected and processed to detect a temperature of the sensor and/or of materials in close proximity to the sensor 12. A moisture sensor can comprise a sensory portion 34 comprising a moisture-sensitive material that undergoes a change in properties as moisture is absorbed by the moisture-sensitive material. A sensory portion 34 of a moisture sensor, which can be adapted for use as a wireless sensor, is disclosed at column 6, lines 24-44 of U.S. Pat. No. 9,983,171, which is incorporated by reference herein. A strain sensor can comprise a sensory portion 34 comprising a conductive element, such as a wire, which changes in resistance under strain. The sensory portion 34 of a strain sensor may also comprise a piezoelectric material or crystal, which changes in resistance as pressure and/or stress is applied thereto.

The following discussion of electrical components of the wireless sensor 12 describe a wireless temperature sensor 12. As will be appreciated by those skilled in the art, a moisture sensor, strain sensor, or any other type of wireless sensor 12 in the transparency 10 can include similar arrangements of electrical components. As shown in FIGS. 2A and 2B, the wireless temperature sensor 12 can be a planar sensor disposed on a substantially flat body or substrate 48. The planar structure can be an appropriate size and shape to be at least partially embedded in one of the inter-sheet layers 30, 32 of the transparency 10. The sensory portion 34 of the sensor 12 is generally small in size (e.g., less than 100 μm in any dimension), though larger sensors 12 may also be used within the scope of the present disclosure. An antenna or wireless transmitter of the sensor 12 may be larger than the sensory portion 34 (e.g., from 1 mm to 1 inch or more). The body or substrate 48 can be formed from materials commonly used for manufacture of printed circuit boards, such as fiber glass, epoxy resin, phenolic resins, or any other convenient material. The substrate 48 may also be formed from other materials used in manufacture of printed electronics including polyethylene terephthalate (PET), polyimide films (e.g., KAPTON®), and/or laminated synthetic papers (e.g., TESLIN®). Additionally, these systems could be printed on the opposite glass surface, on the urethane prior to lamination, or etched out of the conductive heater material The wireless temperature sensor 12 further comprises the sensory portion 34, which can be mounted to the body or substrate 48. The sensory portion 34 can be configured to sense a signal representative of a temperature of a portion of the inter-sheet layer 30, 32 of the transparency 10 immediately adjacent to the wireless temperature sensor 12. The sensory portion 34 can include a variety of electronic components configured to sense a signal representative of temperature including a thermistor, thermocouple, resistance temperature detector, and/or an infrared detector. Each of these electrical components is configured to emit an identifiable resistance change in response to changes in temperature.

The wireless temperature sensor 12 further comprises the wireless transmitter 36 electrically connected to the sensory portion 34 and configured to wirelessly transmit information sensed by the sensory portion 34 to a remote electronic device, such as the wireless receiver 112. The wireless transmitter 36 can comprise one or more antennas for short range data transmission, such as a low-power short-range antenna or a near-field communication antenna. Alternatively or in addition, the wireless transmitter 36 can comprise circuitry for long-range data transmission, such as a cellular transmitter configured to connect with and transmit data through a cellular network.

As will be appreciated by those skilled in the art, data transmitted from the wireless temperature sensor 12 to the remote device may need to be sent at a variety of frequencies and/or sent multiple times to reduce errors caused by data corruption, signal noise, and/or lost data transmissions. To avoid data corruption and reduce errors, the same data set or signal may be sent at two frequencies spaced far enough apart to avoid interference with each other and with external frequencies to increase the possibility that data will be received by the remote device. If redundant data sets are being transmitted at different frequencies at the same time, the signals may need to be spaced apart by 1 MHz or more to avoid interference with each other. If the data sets are being sent at two frequencies one after the other, the frequencies used may be closer together since the sent signals will not interfere with each other. In that case, the data sets are sent at multiple frequencies to avoid interference with any external frequencies. Data may be sent at regular intervals, such as 5 times per second (e.g., every 0.2 second), 20 times per second (e.g., every 0.05 second), or 100 times per second (e.g., every 0.01 second).

The remote receiving device (e.g., the wireless receiver 112) can be configured to error check received data (e.g., received temperature values). Error checking can include comparing data received at different times from the same sensor to identify errors or outliers, which could indicate that certain data is incorrect and/or has been corrupted. Received temperature values that are significantly different than other received temperature values can be ignored. Other standard error checking and/or data correction processes for verification of transmitted data can also be used to ensure that data received from the sensor 12 by the remote device is accurate and complete. Error checking methods for verifying received data can include checksum (e.g., wherein parts of the data stream are configured to always add up to the same number), parity bits (e.g., bits added to a group of source bits to ensure that the source is accurate), cyclic redundancy checks, hash functions, error-correcting codes, and similar verification and error checking processes, as are known in the art.

The wireless temperature sensor 12 can further comprise electrical components for providing power for the sensory portion 34 and the wireless transmitter 36. As shown in FIG. 2A, the wireless sensor 12 can comprise a power source 50 electrically connected to the energy storage device 52. The power source 50 can be a power generator configured to generate electric current in response to an external stimulus or signal, such as an ambient signal or a transmitted signal. The power source 50 can also be a transmitter or receiver device configured to receive power and to provide the power to other components of the sensor 12. The energy storage device 52 can have sufficient charge to provide power for the wireless sensor 12 for the anticipated useable life of the windshield. The energy storage device 52 can also be a rechargeable battery that receives power from the power source 50. Power from the energy storage device 52 can be used to operate components of the wireless sensor 12 when the power source 50 is not generating power and/or to supplement power produced by the power source 50, when additional power is needed for operating the wireless sensor 12.

The power source 50 can be a radio-frequency charging or energy harvesting antenna, as are known in the art, configured to produce power when exposed to an activating signal, such as a radio frequency signal provided from an external electronic device or signal generator. The power source 50 can also be configured to provide power from other stimulus or energy sources including vibrational energy, solar energy, or thermal energy. An energy harvesting antenna that can be used with the sensors 12 of the present disclosure is the POWERHARVESTER® Receiver manufactured by Powercast Corporation located in Pittsburgh, Pa. The power source 50 is configured to produce sufficient power to operate the sensory portion 34 and/or wireless transmitter 36 of the sensor 12. In order to operate such electronic components, the power source 50 may produce from 0.5 mA to 2.0 A or more, depending on requirements of different sensory portions 34 and transmitters 36. The wireless temperature sensor 12 can include only a single antenna. The single antenna can be configured both to generate power when exposed to a radio frequency signal and to wirelessly transmit the sensed signal from the wireless temperature sensor 12 to the remote device, such as the wireless receiver 112. Alternatively, the wireless temperature sensor 12 can comprise multiple antennas for performing different functions. One of the antennas can be a wireless transmitter configured to transmit sensed data to the remote device. A second antenna can be an energy harvesting antenna for generating power for the wireless temperature sensor 12.

The power source 50 can also comprise a thermoelectric member that generates power from heat generated by the transparency 10, such as heat generated by the conductive coating 42. As discussed previously, when electric current is applied to the conductive coating 42, the conductive coating 42 generates heat to de-ice and/or de-fog the transparency 10. The thermoelectric member of the wireless temperature sensor 12 can be configured to generate power as the conductive coating 42 generates heat. As power is generated, the sensory portion 34 of the sensor 12 can be configured to begin to sense information about a condition of the transparency 10, such as a temperature of the heated transparency 10. The sensed temperature signal can be provided from the sensory portion 34 to the wireless transmitter 36. The power produced from the thermoelectric member can cause the wireless transmitter 36 to process and transmit the temperature signal to the remote electronic device, such as the wireless receiver 112 shown in FIG. 4.

As shown in FIG. 2B, the wireless sensor 12 can also be provided without any sort of energy storage device or battery. Instead, as shown in FIG. 2B, the wireless sensor 12 comprises an energy harvesting antenna 54 electrically connected to the sensory portion 34 and the wireless transmitter 36 of the wireless sensor 12. As previously described, the energy harvesting antenna 54 is configured to receive power, such as a transmitted signal from a remote device, such as the wireless receiver 112. The energy harvesting antenna 52 provides the received power to the sensory portion 34 and wireless transmitter 36. Since the sensor 12 in FIG. 2B does not include a battery or storage device, the sensor 12 is passive and only operates when the transmitted signal is being provided to the sensor 12. At other times, the sensor 12 does not sense temperature of the transparency 10 or transmit data to a remote device, such as the wireless receiver 112.

Transparency Monitoring System

The transparencies 10 and wireless sensors 12 disclosed herein can be configured to be integrated with a transparency monitoring system 110, such as a monitoring system for a windshield of a vehicle. As shown in FIG. 4, the transparency monitoring system 110 comprises one or more of the transparencies 10 and the wireless sensors 12. The wireless sensors 12 comprise the sensory portion 34 configured to measure information representative of a condition of a portion of the transparency 10 and the wireless transmitter 36 configured to wirelessly transmit the received information to a remote electric device, such as the wireless receiver 112. As discussed previously, the transparencies 10 and wireless sensors 12 disclosed herein can be adapted to be integrated with existing electrical systems, such as existing electrical systems of a vehicle or building. Accordingly, for a transparency monitoring system 110 for a vehicle, the systems 110 can include or be electrically connected to existing electrical systems, such as existing heater controllers 118, display devices, control panels, user interfaces, and other electronic systems found in vehicles. Information collected from wireless temperature sensors 12 can also be used along with information from rain sensors to control windshield wipers and/or with information from light sensors for auto dimming controls for headlights.

The wireless receiver 112 of the monitoring system 110 can be a dedicated electronic device including circuitry, such as wireless transmitters, antennas, and signal generators, enclosed in a housing 114 for sending and receiving electronic signals from the wireless sensors 12. The wireless receiver 112 can be mounted to the transparency 10, such as to an inside surface of the transparency 10. The wireless receiver 112 may also be separate from the transparency 10. As used herein, "separate from" means that the wireless receiver 112 is not adhered or mounted to the transparency 10 and/or is not in physical contact with any portion of the transparency 10. Instead, the wireless receiver 112 may be mounted to another portion of a vehicle. For an aircraft, the wireless receiver 112 may be located inside the aircraft cockpit and mounted to a portion of the aircraft fuselage. Rather than being mounted to the fuselage, the wireless receiver 112 may be positioned in an electronics cabinet inside the aircraft, such as a cabinet containing other electronic and avionic devices for operating the aircraft. Alternatively, the wireless receiver 112 may be positioned at any other convenient location either inside a vehicle or outside the vehicle. When the wireless transmitter 36 of the wireless sensor 12 is a long-range transmitter, such as a cellular transmitter, the wireless receiver 112 may be located far from the transparency 10 and vehicle, such as at a central maintenance facility. In that case, a computer server at the central maintenance facility may be configured to receive data from wireless sensors 12 located on different transparencies 10 and/or different aircraft.

The wireless receiver 112 comprises one or more wireless antennas 130 configured to wirelessly receive signals transmitted by the wireless transmitter 36 of the wireless sensor 12. Generally, the received signals are digital signals generated based on information sensed by the sensory portion 34 of the wireless sensor 12. The wireless receiver 112 can be configured to receive signals from a single wireless sensor 12 or from multiple wireless sensors 12 located on one transparency 10. The wireless receiver 112 can also be configured to receive signals from wireless sensors 12 on multiple transparencies 10, such as multiple transparencies 10 joined together to form a windshield of a vehicle. The wireless receiver 112 can process the received digital signal and translate the received digital signal into an analog signal. The translated analog signal can resemble an analog signal output by a conventional wired sensor used in existing vehicles and windshields.

By way of example, a wired temperature sensor outputs an analog signal representative of resistance of a thermistor (e.g., a resistive temperature device). The wireless receiver 112 can be configured to mimic such analog resistance signals. More specifically, the wireless receiver 112 can be configured to receive the digital signal from a wireless temperature sensor 12 representative of temperature of a portion of the transparency 10. The wireless receiver 112 can translate the digital signal, such that the signal output by the wireless receiver 112 is an analog signal for resistance over time. An amplitude of the output signal can be representative of temperatures measured by the wireless temperature sensor 12.

The analog signal output by the wireless receiver 112 can be provided to a number of existing systems and devices of a vehicle. The analog signal can be provided to a display device 116 of the vehicle, such as a display device configured to receive analog signals from conventional wired sensors. The display device 116 can be configured to process the received analog signal to determine a measured value representing a condition of the transparency 10 and to cause the determined measured value(s) to be displayed to a user. The display device 116 can be a numeric display (e.g., a display configured to display alpha-numeric characters), which displays numeric values representative of the determined values. The display device 116 can also comprise actual or virtual gauges, dials, or other visual indicators for conveying information about a status of the transparency 10 to a user.

The analog signal can also be provided from the wireless receiver 112 to electrical systems that control operation of the vehicle. As shown in FIG. 4, the wireless receiver 112 can be electrically connected to a heater controller 118. The heater controller 118 is electrically connected to the heating arrangement 40 of the transparency 10 and is configured to provide electric current to the conductive coating 42 to heat the conductive coating 42. The electrical connection between the wireless receiver 112, heater controller 118, and heating arrangement 40 is generally a wired connection, in which wires extend from the heating arrangement 40 and wireless receiver 112 to the heater controller 118. However, wireless connections can also be used for transmitting data between the heater controller 118, wireless receiver 112, and/or heating arrangement 40. In order to facilitate wireless communication, the heater controller 118 can comprise a wireless transmitter or transceiver for sending wireless communication to the wireless receiver 112.

As discussed previously, the heater controller 118 can be a conventional heater controller used in existing vehicles for providing electrical current to the heating arrangement 40. The heating controller 118 can comprise a power source 120 for providing the electric current to the conductive coating 42 of the transparency 10. In order to provide power from the power source 120 to the heating arrangement 40, as shown in FIGS. 3 and 4, wire leads 122, 124 can extend from the power source 120 to the bus bars 44, 46 of the transparency 10. Electric current generated by the power source 120 passes through the leads 122, 124 and to the conductive coating 42 through the bus bars 44, 46.

The heater controller 118 can be configured to control an intensity of the electric current from the power source 120 to the conductive coating 42 based on information received from wireless temperature sensors 12 in the transparency 10. In order to control a temperature of the coating 42, the heater controller 118 can be configured to receive a signal from the wireless receiver 112. The heater controller 118 processes the signal to determine a temperature value sensed by the wireless temperature sensor 12 and compares the determined temperature value to a predetermined threshold value. The threshold value can be a maximum safe operating temperature of the conductive coating 42 or transparency 10. The threshold value can also be a temperature sufficient to melt any ice on the windshield and to remove fog and condensation from the transparency 10. Based on the comparison between the measured value and the threshold value, the heater controller 118 can be configured to adjust a flow of electrical current from the power source 120 to the conducive coating 42 to prevent damage to the conductive coating 42 and transparency 10. The heater controller 118 can further comprise a switch 126 for entirely disconnecting the power source 120 from the conductive coating 42. As shown in FIG. 4, the switch 126 can be positioned along one of the leads 122, 124. If measured temperature is substantially outside of an accepted temperature range, the heater controller 118 can be configured to open the switch 126 to disconnect the power source 120 from the conductive coating 42. When no electric current passes through the leads 122, 124 to the conductive coating 42, a temperature of the conductive coating 42 no longer increases due to applied electric current. Ceasing a flow of electric current to the conductive coating 42 can prevent the conductive coating 42 from overheating and/or can prevent damage to the coating 42 or transparency 10 caused by arcing.

In addition to receiving sensed information from the wireless sensors 12 and providing the analog signals to other electrical systems and devices, the wireless receiver 112 can also be configured to provide signals to the wireless sensors 12 for power generation. As discussed previously, the wireless sensor 12 can include the power source 50 which, when exposed to an electromagnetic signal from another device, produces sufficient power for operating the sensory portion 34 and/or wireless transmitter 36 of the sensor 12. The wireless receiver 112 can be configured to provide such a powering signal for the wireless sensor 12. In order to produce the electromagnetic signal, the wireless receiver 112 can comprise a signal generator 128, such as a radio-frequency generator, a light source, an ultrasonic wave generator, and/or other wireless power transmission systems. The signal generator 128 can be configured to continually, periodically, or at unscheduled intervals produce the electromagnetic signal for powering the wireless sensor 12. The wireless sensor 12 can use power produced by the generator 50 to power the sensory portion 34 and/or wireless transmitter 36. Alternatively, generated power is stored in the energy storage device 52. Once sufficient power is generated and/or stored in the energy storage device 52, the wireless transmitter 36 of the sensor 12 can begin to emit a signal representative of a sensor reading. The wireless receiver 112 can be configured to detect the emitted response signal from the transmitter 36 and process the received signal as described previously.

Aircraft Windshield

Figure 5A:
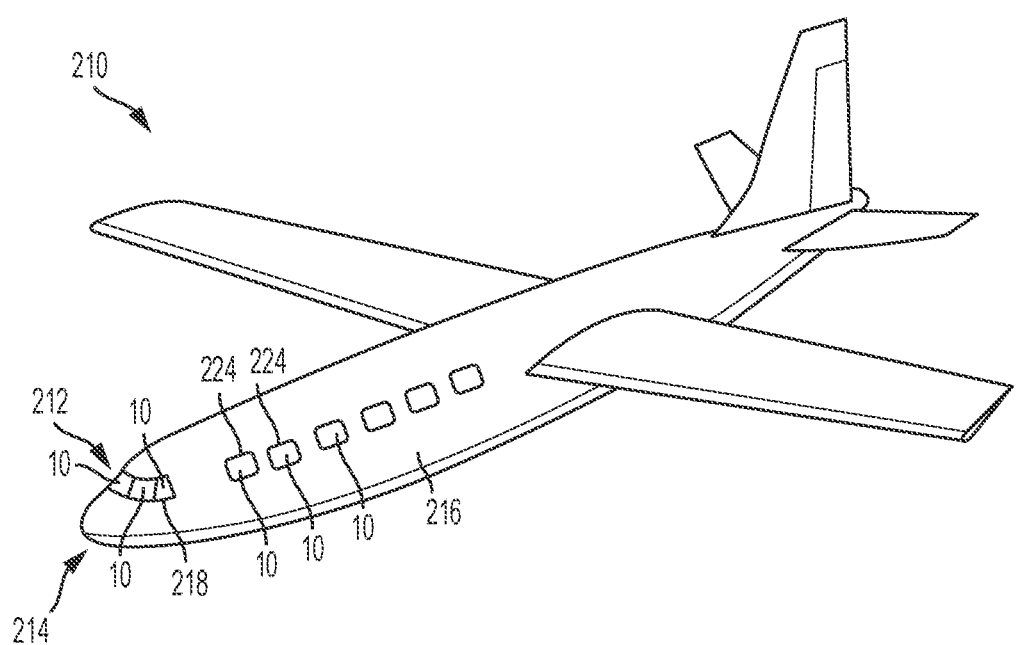
FIG. 5A is a schematic drawing of an aircraft.
Figure 5B:
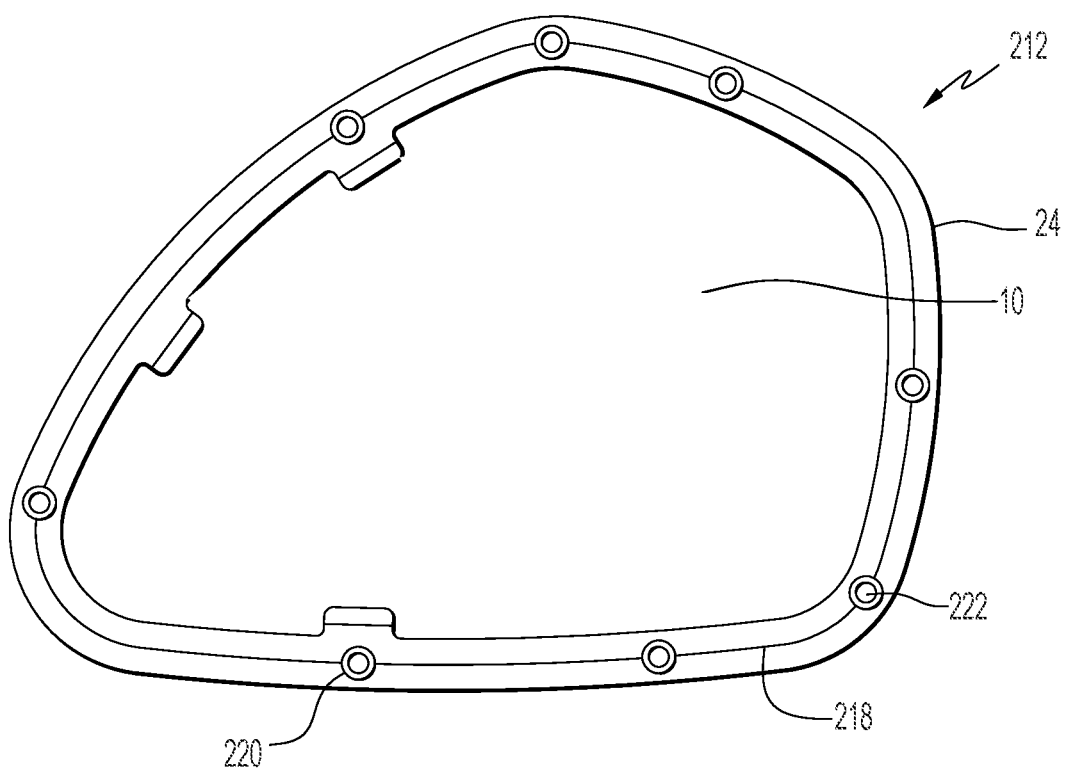
FIG. 5B is a schematic drawing of a portion of an aircraft windshield including a mounting bracket for connecting the windshield to a fuselage of the aircraft of FIG. 5A.

The transparencies 10 and wireless sensors 12 disclosed herein can be integrated into vehicles, such as an aircraft 210. As shown in FIGS. 5A and 5B, an aircraft 210 including features of the present disclosure can comprise an aircraft windshield 212 mounted to a front or cockpit portion 214 of a fuselage 216 of the aircraft 210 by a mounting bracket 218. The windshield 212 can be formed from any number of separate transparencies 10 mounted adjacent to one another to form a suitable viewing region or regions for a pilot to safely operate the aircraft 210. As shown in FIG. 5A, the windshield 212 includes three transparencies 10 arranged side-by-side. Other aircraft windshields can include fewer or more than three transparencies 10. Some windshields can include two or more rows of transparencies 10. In other cases, as shown in FIG. 5A, the windshield 212 is formed from a single row of transparencies 10 arranged side-by-side to form the windshield 212. The aircraft 210 also includes cabin or passenger windows 224, which can also comprise the transparencies 10 and wireless sensors 12 of the present disclosure.

With specific reference to FIG. 5B, the mounting bracket 218 can be any convenient structure for connecting one or more of the transparencies 10 to a fuselage 216 of the aircraft 210. The mounting bracket 218 can comprise holes 220 configured to align with holes on the peripheral region 28 of the transparencies 10. Bolts or similar fasteners 222 can be inserted through the holes 220 of the mounting bracket 218 and transparencies 10 to attach the transparencies 10 to the mounting bracket 218. Insulating and sealing structures, such as moisture seals, can be provided around the peripheral surface 24 of the transparencies 10 and/or between portions of the transparency 10 and mounting bracket 218 to enhance the connection between the transparency 10 and mounting bracket 218.

Various electronic components of the transparency monitoring system 110 disclosed herein can be provided inside the aircraft 210 and configured to be in wired or wireless electronic communication with the wireless sensors 12 of the transparencies 10. In particular, the wireless receiver 112 can be mounted to the aircraft fuselage 216 in close proximity to the transparencies 10, so that the wireless receiver 112 can be in electronic communication with the wireless sensors 12 using short-range data transmission devices. The wireless receiver 112 can be in wired connection with electrical systems of the aircraft 210, such as a control panel or digital display used by the aircraft pilot for displaying measured values to the pilot. Also, the wireless receiver 112 can be in wired communication with existing aircraft control systems, such as the heater controller 118, as described previously.

Fabrication Method

Figure 6:
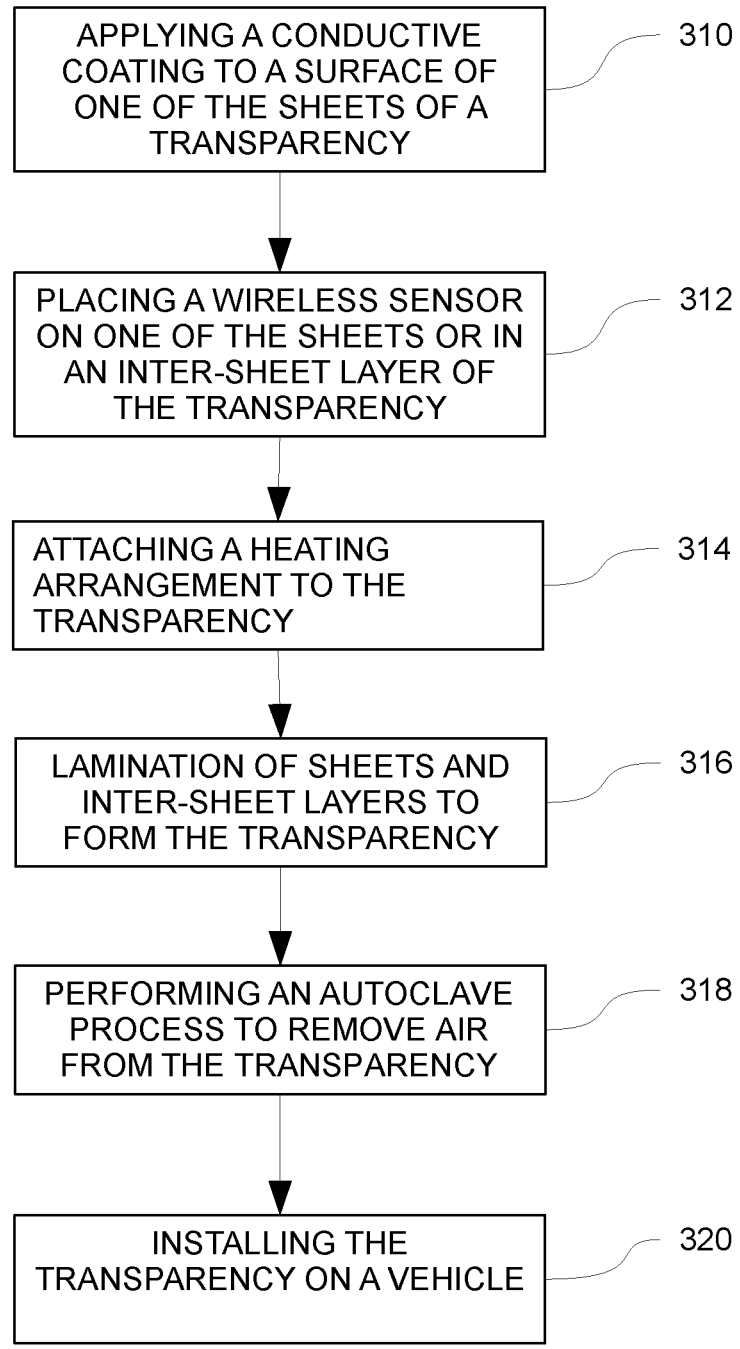
FIG. 6 is a flow chart of a method of manufacture for a laminated transparency.

A method for fabricating a transparency 10 including the wireless sensors 12 of the present disclosure is shown by the flow chart in FIG. 6.

As shown at step 310, the method includes applying a conductive coating 42 to a surface of a glass or plastic sheet 14, 16, 18. As previously discussed, the conductive coating 42 is configured to be electrically connected to a power source 120 for heating the conductive coating 42 for de-icing and de-fogging. The conductive coating 42 can be applied to an inwardly facing side of the sheet 14, 16, 18, so that the conductive coating 42 is protected from damage caused when objects contact the outermost surfaces of the sheets 14, 16, 18. The conductive coating 42 can also be applied to an outermost or outwardly facing surface of one of the sheets 14, 16, 18, either prior to lamination or after the sheets 14, 16, 18 and inter-sheet layer(s) 30, 32 have been laminated together to form the transparency 10.

At step 312, the method further includes placing a wireless sensor 12 at a convenient location on one of the sheets 14, 16, 18 of the transparency 10. The wireless sensor 12 can be positioned on an outermost surface of one of the sheets 14, 16, 18 of the transparency 10, as is the case for a sensor 12 positioned between an outermost surface of one of the sheets 14, 16, 18 and the moisture barrier 38 extending around a periphery of the transparency 10. The wireless sensor 12 can also be at least partially embedded within an inter-sheet layers 30, 32 of the transparency 10 to protect the wireless sensor 12, thereby prolonging a usable life of the transparency 10. In order to at least partially embed the sensor 12 within the transparency 10, the sensor 12 may be connected to an inwardly facing surface of one of the sheets 14, 16, 18 such that, following lamination, the wireless sensor 12 is encapsulated between the inwardly facing surface of the sheet 14, 16, 18 and the inter-sheet layer 30, 32. A wireless sensor 12 can also be pressed into an inter-sheet layer 30, 32 during formation and/or prior to curing or lamination of the inter-sheet layer 30, 32, such that following lamination, the wireless sensor 12 is entirely encapsulated by the inter-sheet layer 30, 32.

As will be appreciated by those skilled in the art, additional fabrication steps can be performed depending on the intended use of the transparency 10. Additional coating layers can be applied to surfaces of the sheets 14, 16, 18 prior to or after lamination to protect the transparency 10 and/or to provide improved performance. Coatings that can be applied to the transparency 10 can include ultraviolet radiation resistant coatings, reflective and/or polarized coatings, and other types of protective coatings as are known in the art.

At step 314, the method can further include attaching conductive elements of the heating arrangement 40 such as wire leads 122, 124 and/or bus bars 44, 46 to the conductive coating 42 so that electric current can be applied thereto. Also, the leads 122, 124 can be connected to bus bars 44, 46 on one of the sheets 14, 16, 18 of the transparency 10. The leads 122, 124 can extend from the transparency 10 and connect to the heater controller 118.

At step 316, after the conductive coating 42 and sensor 12 have been placed on the sheets 14, 16, 18 or inter-sheet layers 30, 32, the transparency 10 can be produced by joining together the sheets 14, 16, 18 and inter-sheet layers 30, 32. The sheets 14, 16, 18 and inter-sheet layers 30, 32 can be joined together by a lamination process, as is known in the art, to produce a laminated transparency 10 including a plurality of interconnected sheets 14, 16, 18 and inter-sheet layers 30, 32. At step 318, an autoclave process can be applied to the transparency 10 to remove air from between the sheets 14, 16, 18 and/or inter-sheet layers 30, 32 to produce a clear singular transparency structure. After autoclaving, a sealant material can be applied to the transparency 10 to prevent moisture from entering the transparency 10.

At step 320, the method further includes installing the transparency 10 in the vehicle. Installing the transparency 10 can include connecting wire leads extending from the transparency 10 to electrical systems of the vehicle. Installing the transparency can also include mounting the transparency 10 to a frame and/or connecting the frame to a corresponding frame of the vehicle. Installing the transparency 10 can also include connecting associated electronic devices, such as the wireless receiver 112, to the transparency 10 or to a portion of the vehicle in proximity to the transparency 10, so that the receiver 112 can send signals to and receive response signals from sensors 12 in the transparency.

Whereas particular embodiments of this invention have been described above for purposes of illustration, it will be evident to those skilled in the art that numerous variations of the details of the present invention may be made without departing from the invention as defined in the appended claims.

In view of the foregoing description, the present invention thus relates inter alia to the subject matter of the following clauses though being not limited thereto.

Clause 1: A transparency comprising; a plurality of sheets, each sheet comprising a first major surface, an opposite second major surface, and a peripheral surface between the first major surface and the second major surface; an inter-sheet layer positioned between the first major surface of one of the sheets of the plurality of sheets and the second major surface of an adjacent sheet of the plurality of sheets; and a wireless sensor positioned in the inter-sheet layer, the wireless sensor comprising a sensory portion configured to measure information representative of a condition of a portion of the transparency and a wireless transmitter configured to wirelessly transmit the received information to a wireless receiver.

Clause 2: The transparency of clause 1, wherein the wireless sensor comprises temperature sensors, moisture sensor, strain sensor, corrosion sensor, impact sensor, breakage sensor, current sensor, arcing sensor, partial discharge sensor, voltage sensor, resistance sensor, or p-static sensor.

Clause 3: The transparency of clause 1 or clause 2, wherein the wireless sensor comprises a temperature sensor, and the sensory portion of the temperature sensor comprises a thermistor, a thermocouple, and/or an infrared detector.

Clause 4: The transparency of any of clauses 1-3, wherein the wireless sensor comprises a power source for providing power for the sensory portion and/or the wireless transmitter of the wireless sensor.

Clause 5: The transparency of clause 4, wherein the power source comprises an energy harvesting antenna configured to collect energy from ambient or transmitted signals.

Clause 6: The transparency of any of clauses 1-5, wherein the wireless transmitter comprises a low-power short-range antenna, a radio-frequency charging antenna, and/or a near-field communication antenna.

Clause 7: The transparency of any of clauses 1-6, further comprising a conductive coating on one of the major surfaces of one of the plurality of sheets, the conductive coating being configured to generate heat for defogging and/or de-icing the transparency, wherein the wireless sensor comprises a power source for providing power to the sensory portion and/or to the wireless transmitter, the power source comprising a thermoelectric member configured to generate power due to heating of the conductive coating.

Clause 8: The transparency of any of clauses 1-7, comprising more than one wireless sensor, wherein the more than one wireless sensor comprises a first wireless sensor of a first type and a second wireless sensor of a second type different than the first type, and wherein the type of wireless sensor is a temperature sensor, a moisture sensor, a strain sensor, a corrosion sensor, an impact sensor, a breakage sensor, a current sensor, an arcing sensor, a partial discharge sensor, a voltage sensor, a resistance sensor, or a p-static sensor.

Clause 9: An aircraft windshield comprising the transparency of any of clauses 1-8 and a mounting bracket for mounting the transparency to a fuselage of the aircraft.

Clause 10: A transparency monitoring system, comprising: the transparency of any of clauses 1-8; and a wireless receiver in wireless communication with the wireless sensor of the transparency configured to receive and process the information from the wireless sensor.

Clause 11: The system of clause 10, wherein the wireless sensor further comprises a power source configured to generate power in response to a signal wirelessly received from the wireless receiver.

Clause 12: The system of clause 10 or clause 11, wherein the wireless receiver comprises a radio-frequency generator, an infrared source, and/or an ultrasonic wave generator for generating a signal for providing power to the wireless sensor.

Clause 13: The system of any of clauses 10-12, wherein the wireless sensor comprises a wireless temperature sensor configured to measure information representative of a temperature of a portion of the inter-sheet layer.

Clause 14: The system of clause 13 wherein the transparency further comprises a conductive coating on a sheet of the plurality of sheets configured to generate heat for defogging and/or de-icing the transparency.

Clause 15: The system of clause 14, wherein the wireless receiver is configured to receive and process the information representative of a temperature of a portion of the inter-sheet layer from the wireless temperature sensor, generate a signal from the received information, and communicate the signal to the heater controller.

Clause 16: The system of clause 15, further comprising the heater controller, wherein the heater controller comprises a power supply for providing electric current to the conductive coating, the heater controller being configured to: receive the signal from the wireless receiver; process the signal to determine a temperature value sensed by the wireless temperature sensor; compare the determined temperature value to a predetermined threshold value; and cause the power supply to adjust an intensity of electric current provided to the conductive coating based on the comparison between the determined temperature value and the predetermined threshold value.

Clause 17: The system of clause 16, wherein the heater controller is configured to electronically disconnect the power supply from the conductive coating when the determined temperature value exceeds the predetermined threshold value.

Clause 18: The system of any of clauses 14-17, wherein the wireless receiver is configured to receive and process the information representative of a temperature of a portion of the inter-sheet layer from the wireless temperature sensor as a digital signal, translate the digital signal to an analog signal compatible with a heater controller associated with the transparency, and communicate the analog signal to the heater controller.

Clause 19: A method of making a laminated transparency, comprising: fabricating the transparency of any of clauses 1-8 by joining together the plurality of sheets, wherein adjacent sheets are spaced apart by the inter-sheet layer; and during fabrication of the transparency, placing the wireless sensor in the inter-sheet layer between the adjacent sheets of the plurality of sheets.

Clause 20: The method of clause 19, further comprising, during fabrication of the transparency, applying a conductive coating on one of the major surfaces of one of the plurality of sheets, the conductive coating being configured to generate heat for defogging and/or de-icing the transparency.

Clause 21: A monitoring method for a transparency, comprising: receiving, via a wireless receiver, a first signal representative of a temperature of a portion of the transparency from a wireless temperature sensor positioned in an inter-sheet layer of the transparency; processing, with a processor of the wireless receiver, the received first signal to generate a second signal representative of the temperature of the portion of the transparency, wherein the second signal is compatible with a heater controller configured to heat a conductive coating of the transparency; and transmitting the second signal from the wireless receiver to the heater controller.

Clause 22: The method of clause 21, further comprising: receiving, with the heater controller, the second signal from the wireless receiver; processing, with a processor of the heater controller, the second signal to determine a temperature value sensed by the wireless temperature sensor; comparing, with the processor of the heater controller, the determined temperature value to a predetermined threshold value; and causing a power supply of the heater controller to adjust an intensity of electric current provided to the conductive coating of the transparency based on the comparison between the determined temperature value and the predetermined threshold value.

Clause 23: The system of clause 22, further comprising electronically disconnecting the power supply from the conductive coating when the determined temperature value exceeds the predetermined threshold value.

Clause 24: The system of any of clauses 21-23, wherein the first signal comprises an analog signal and the second signal comprises a digital signal.

What is claimed is:
1. A transparency comprising:
a plurality of sheets, each sheet comprising a first major surface, an opposite second major surface, and a peripheral surface between the first major surface and the second major surface;
an inter-sheet layer positioned between the first major surface of one of the sheets of the plurality of sheets and the second major surface of an adjacent sheet of the plurality of sheets; and
a wireless temperature sensor positioned in the inter-sheet layer, the wireless temperature sensor comprising a sensory portion configured to measure information representative of a condition of a portion of the transparency, the sensory portion comprising a thermistor, a thermocouple, and/or an infrared detector, and a wire- less transmitter configured to wirelessly transmit the measured information to a wireless receiver; and wherein the wireless transmitter is configured to transmit the measured data at multiple frequencies and/or at multiple times.

2. The transparency of claim 1, wherein the wireless sensor comprises a temperature sensor, moisture sensor, strain sensor, corrosion sensor, impact sensor, breakage sensor, current sensor, arcing sensor, partial discharge sensor, voltage sensor, resistance sensor, or p-static sensor.

3. The transparency of claim 1, wherein the wireless temperature sensor comprises a power source for providing power for the sensory portion and/or the wireless transmitter of the wireless temperature sensor.

4. A transparency comprising:
a plurality of sheets, each sheet comprising a first major surface, an opposite second major surface, and a peripheral surface between the first major surface and the second major surface;
an inter-sheet layer positioned between the first major surface of one of the sheets of the plurality of sheets and the second major surface of an adjacent sheet of the plurality of sheets; and
a wireless sensor positioned in the inter-sheet layer, the wireless sensor comprising a sensory portion configured to measure information representative of a condition of a portion of the transparency and a wireless transmitter configured to wirelessly transmit the measured information to a wireless receiver,
wherein the wireless transmitter is configured to transmit the measured data at multiple frequencies and/or at multiple times,
wherein the wireless sensor comprises a power source for providing power for the sensory portion and/or the wireless transmitter of the wireless sensor, and
wherein the power source comprises an energy harvesting antenna configured to collect energy from ambient or transmitted signals.

5. The transparency of claim 1, wherein the wireless transmitter comprises a low-power short-range antenna, a radio-frequency charging antenna, and/or a near-field communication antenna.

6. The transparency of claim 1, further comprising a conductive coating on one of the major surfaces of one of the plurality of sheets, the conductive coating being configured to generate heat for defogging and/or de-icing the transparency, and wherein the wireless temperature sensor comprises a power source for providing power to the sensory portion and/or to the wireless transmitter, the power source comprising a thermoelectric member configured to generate power due to heating of the conductive coating.

7. The transparency of claim 4, comprising more than one wireless sensor, wherein the more than one wireless sensor comprises a first wireless sensor of a first type and a second wireless sensor of a second type different than the first type, and wherein the type of sensor is a temperature sensor, a moisture sensor, a strain sensor, a corrosion sensor, an impact sensor, a breakage sensor, a current sensor, an arcing sensor, a partial discharge sensor, a voltage sensor, a resistance sensor, or a p-static sensor.

8. An aircraft windshield comprising the transparency of claim 1 and a mounting bracket for mounting the transparency to a fuselage of the aircraft.

9. A transparency monitoring system, comprising:
the transparency of claim 1; and
a wireless receiver in wireless communication with the wireless temperature sensor of the transparency configured to receive and process the information from the wireless temperature sensor.

10. The system of claim 9, wherein the wireless temperature sensor further comprises a power source configured to generate power in response to a signal wirelessly received from the wireless receiver.

11. A transparency monitoring system comprising:
a transparency comprising:
a plurality of sheets, each sheet comprising a first major surface, an opposite second major surface, and a peripheral surface between the first major surface and the second major surface;
an inter-sheet layer positioned between the first major surface of one of the sheets of the plurality of sheets and the second major surface of an adjacent sheet of the plurality of sheets; and
a wireless sensor positioned in the inter-sheet layer, the wireless sensor comprising a sensory portion configured to measure information representative of a condition of a portion of the transparency and a wireless transmitter configured to wirelessly transmit the measured information to a wireless receiver, wherein the wireless transmitter is configured to transmit the measured data at multiple frequencies and/or at multiple times; and
a wireless receiver in wireless communication with the wireless sensor of the transparency configured to receive and process the information from the wireless sensor,
wherein the wireless receiver comprises a radio-frequency generator, an infrared source, and/or an ultrasonic wave generator for generating a signal for providing power to the wireless sensor.

12. The system of claim 11, wherein the wireless sensor comprises a wireless temperature sensor configured to measure information representative of a temperature of a portion of the inter-sheet layer.

13. The system of claim 12 wherein the transparency further comprises a conductive coating on a sheet of the plurality of sheets configured to generate heat for defogging and/or de-icing the transparency.

14. The system of claim 13, wherein the wireless receiver is configured to receive and process the information representative of a temperature of a portion of the inter-sheet layer from the wireless temperature sensor, generate a signal from the received information, and communicate the signal to the heater controller.

15. The system of claim 14, further comprising the heater controller, wherein the heater controller comprises a power supply for providing electric current to the conductive coating, the heater controller being configured to:
receive the signal from the wireless receiver;
process the signal to determine a temperature value sensed by the wireless temperature sensor;
compare the determined temperature value to a predetermined threshold value; and
cause the power supply to adjust an intensity of electric current provided to the conductive coating based on the comparison between the determined temperature value and the predetermined threshold value.

16. The system of claim 15, wherein the heater controller is configured to electronically disconnect the power supply from the conductive coating when the determined temperature value exceeds the predetermined threshold value.

17. The system of claim 13, wherein the wireless receiver is configured to receive and process the information representative of a temperature of a portion of the inter-sheet layer from the wireless temperature sensor as a digital signal, translate the digital signal to an analog signal compatible with a heater controller associated with the transparency, and communicate the analog signal to the heater controller.

18. A method of making a laminated transparency, comprising:
   fabricating the transparency of claim 1 by joining together the plurality of sheets, wherein adjacent sheets are spaced apart by the inter-sheet layer; and
   during fabrication of the transparency, placing the wireless temperature sensor in the inter-sheet layer between the adjacent sheets of the plurality of sheets.

19. The method of claim 18, further comprising, during fabrication of the transparency, applying a conductive coating on one of the major surfaces of one of the plurality of sheets, the conductive coating being configured to generate heat for defogging and/or de-icing the transparency.

20. The transparency of claim 4, wherein the wireless transmitter comprises a low-power short-range antenna, a radio-frequency charging antenna, and/or a near-field communication antenna.

* * * * *